US012692136B2

(12) United States Patent
Ma et al.

(10) Patent No.: US 12,692,136 B2
(45) Date of Patent: Jul. 28, 2026

(54) AUXILIARY BOOM, CRANE, METHOD FOR UNFOLDING AUXILIARY BOOM AND METHOD FOR RETRACTING AUXILIARY BOOM

(71) Applicant: Xuzhou Heavy Machinery Co., Ltd., Xuzhou (CN)

(72) Inventors: Shanhua Ma, Xuzhou (CN); Yanwei Zhang, Xuzhou (CN); Wei Zhu, Xuzhou (CN); Wei Li, Xuzhou (CN)

(73) Assignee: XUZHOU HEAVY MACHINERY CO., LTD., Xuzhou (CN)

( * ) Notice: Subject to any disclaimer, the term of this patent is extended or adjusted under 35 U.S.C. 154(b) by 310 days.

(21) Appl. No.: 18/546,843

(22) PCT Filed: Feb. 23, 2022

(86) PCT No.: PCT/CN2022/077371
§ 371 (c)(1),
(2) Date: Aug. 17, 2023

(87) PCT Pub. No.: WO2022/179512
PCT Pub. Date: Sep. 1, 2022

(65) Prior Publication Data

US 2025/0074750 A1 Mar. 6, 2025

(30) Foreign Application Priority Data

Feb. 23, 2021 (CN) ......................... 202120395086.8
Apr. 29, 2021 (CN) ......................... 202110475361.1

(51) Int. Cl.
*B66C 23/70* (2006.01)
*B66C 23/66* (2006.01)

(52) U.S. Cl.
CPC ............. *B66C 23/70* (2013.01); *B66C 23/66* (2013.01)

(58) Field of Classification Search
CPC ....... B66C 23/702; B66C 23/66; B66C 23/68; B66C 23/42
See application file for complete search history.

(56) References Cited

U.S. PATENT DOCUMENTS 4,141,455 A * 2/1979 Henderson ............ B66C 23/702 212/300
4,431,109 A * 2/1984 Behrendt .............. B66C 23/702 212/347

(Continued)

FOREIGN PATENT DOCUMENTS

CN 102137809 A 7/2011
CN 103010973 A 4/2013

(Continued)

OTHER PUBLICATIONS

CN 215516434U Machine Translation. (Year: 2022).*

(Continued)

*Primary Examiner* — Robert W Hodge
*Assistant Examiner* — Juan J Campos, Jr.
(74) *Attorney, Agent, or Firm* — Cooley LLP

(57) ABSTRACT

Disclosed are an auxiliary boom, a crane, a method for unfolding an auxiliary boom and a method for retracting an auxiliary boom. The auxiliary boom comprises an auxiliary boom body and a jackscrew mechanism. The auxiliary boom body comprises a connecting frame. The jackscrew mechanism comprises a first shaft, a second shaft and a driving mechanism; the first shaft and the second shaft are both arranged between the first connecting hole and the second connecting hole; the driving mechanism is in driving connection with the first shaft and the second shaft When the first shaft is in a protruded state, the first shaft is inserted into (Continued)

the first connecting hole; when the second shaft is in the protruded state, the second shaft is inserted into the second connecting hole.

18 Claims, 11 Drawing Sheets

(56) References Cited

U.S. PATENT DOCUMENTS

| | | | | |
|---|---|---|---|---|
| 4,491,229 | A * | 1/1985 | Behrendt | B66C 23/702 212/347 |
| 6,036,035 | A * | 3/2000 | Asano | B66C 23/702 212/300 |
| 7,337,912 | B1 * | 3/2008 | Hull | B66C 23/42 212/300 |
| 10,647,552 | B1 * | 5/2020 | Jones | B66C 23/702 |
| 2004/0238471 | A1 | 12/2004 | Lissandre | |
| 2011/0147331 | A1 | 6/2011 | Tanaka et al. | |
| 2017/0081156 | A1 | 3/2017 | Zhang et al. | |
| 2018/0251347 | A1 * | 9/2018 | Hull | B66C 23/42 |

FOREIGN PATENT DOCUMENTS

| | | | |
|---|---|---|---|
| CN | 103058075 | A | 4/2013 |
| CN | 104003317 | A | 8/2014 |
| CN | 104176657 | A | 12/2014 |
| CN | 204802892 | U | 11/2015 |
| CN | 105217492 | A | 1/2016 |
| CN | 205294674 | U | 6/2016 |
| CN | 108002257 | A | 5/2018 |
| CN | 108502751 | A | 9/2018 |
| CN | 211569926 | U | 9/2020 |
| CN | 113120782 | A | 7/2021 |
| CN | 215516434 | U | 1/2022 |
| JP | 2001-019352 | A | 1/2001 |
| JP | 2018-080045 | A | 5/2018 |
| RU | 2225831 | C2 | 3/2004 |
| RU | 2336220 | C2 | 10/2008 |
| WO | WO-2010/024151 | A1 | 3/2010 |

OTHER PUBLICATIONS

CN 113120782A Machine Translation. (Year: 2021).*

CN 105217492A Machine Translation. (Year: 2016).*

International Search Report mailed on May 26, 2022, for PCT Application No. PCT/CN2022/077371, filed on Feb. 23, 2022, 8 pages (with English Translation).

Written Opinion of the International Searching Authority mailed on May 26, 2022, for PCT Application No. PCT/CN2022/077371, filed on Feb. 23, 2022, 10 pages (with English Translation).

International Preliminary Report on Patentability for International Application No. PCT/CN2022/077371 mailed Aug. 29, 2023, 11 pages.

Office Action for Chinese Application No. 202110475361.1 mailed Oct. 13, 2023, 21 pages.

Office Action for Russian Application No. 2023122423/11 mailed Apr. 18, 2024, 32 pages.

* cited by examiner

AUXILIARY BOOM, CRANE, METHOD FOR UNFOLDING AUXILIARY BOOM AND METHOD FOR RETRACTING AUXILIARY BOOM

CROSS-REFERENCE TO RELATED APPLICATIONS

This application is a U.S. National Phase application, filed under 35 U.S.C. § 371 of International Application No. PCT/CN2022/077371, filed Feb. 23, 2022, which is based on and claims the priorities of a Chinese patent application with an application number of 202110475361.1 and an application date of Apr. 29, 2021, and a Chinese patent application with an application number of 202120395086.8 and an application date of Feb. 23, 2021, the disclosures of which are entirely incorporated herein by reference.

FIELD OF THE INVENTION

The present disclosure relates to the field of engineering machinery, and particularly to an auxiliary boom, a crane, a method for unfolding an auxiliary boom and a method for retracting an auxiliary boom.

DESCRIPTION OF RELATED ART

In order to obtain suitable lifting height and amplitude, the crane is designed with a telescopic multi-section boom. However, due to the limitations of structure and weight, in the related art, the main boom has 3 to 7 sections, and generally has not more than 5 sections for small and medium tonnage cranes. In order to further protrude the length of the boom to achieve greater lifting height and amplitude, the crane is equipped with an auxiliary boom. When not in use, the auxiliary boom is mounted on a side of a basic arm of the main boom; and when in use, the auxiliary boom is mounted on a head of a tail arm of the main boom and connected thereto by a pin.

In the related art, the auxiliary boom is unfolded when it is to be used. When the auxiliary boom is to be unfolded, after the related connecting pin for mounting the auxiliary boom to the basic arm of the main boom is dismounted, firstly the auxiliary boom is rotated around a rotating shaft of a first bracket mounted on the main boom until an auxiliary boom mounting hole is aligned with a connecting hole on one side of the arm head of the tail arm in a width direction: next, a first connecting pin is inserted into the auxiliary boom mounting hole and the connecting hole aligned therewith. Two connecting holes adopting the same operation are provided on the one side of the arm head of the tail arm in the width direction; next, a pin of the first bracket is pulled out, so that the auxiliary boom is no longer in connection with the first bracket, and then continues to be pushed to rotate around the first connecting pin until the mounting hole on the other side of the auxiliary boom is aligned with the connecting hole on the other side of the arm head in the width direction: next, two second connecting pins are inserted. At this point, the mounting and the fixation of the auxiliary boom are finished. In order to retract the auxiliary boom, it is necessary to gradually pull out the respective pins.

The first connecting pin and the second connecting pin are arranged on two sides of a boom frame in a width direction. There are provided two first connecting pins and two second connecting pins, and two pins are coaxially arranged up and down on each side of the boom frame in the width direction. During mounting, the auxiliary boom is rotated until the auxiliary boom mounting hole is aligned with the main boom connecting hole, and then the four pins are knocked into the aligned holes in turn with a tool.

SUMMARY OF THE INVENTION

The present disclosure proposes an auxiliary boom, a crane, a method for unfolding an auxiliary boom and a method for retracting an auxiliary boom, in order to simplify mounting and dismounting of the auxiliary boom.

The embodiments of the present disclosure provide an auxiliary boom, comprising:

- an auxiliary boom body comprising a connecting frame: the connecting frame comprises a first connecting hole and a second connecting hole which are coaxially arranged; and
- a jackscrew mechanism comprising a first shaft, a second shaft and a driving mechanism; the first shaft and the second shaft are both arranged between the first connecting hole and the second connecting hole and coaxial with the first connecting hole; the driving mechanism is in driving connection with both the first shaft and the second shaft to drive the first shaft and the second shaft to protrude simultaneously and retract simultaneously;
- wherein when the first shaft is in a protruded state, the first shaft is inserted into the first connecting hole: when the first shaft is in a retracted state, the first shaft leaves the first connecting hole: when the second shaft is in the protruded state, the second shaft is inserted into the second connecting hole; and when the second shaft is in the retracted state, the second shaft leaves the second connecting hole.

In some embodiments, the driving mechanism comprises:

- a first connecting seat fixedly connected to the connecting frame and provided with a first through hole allowing the first shaft to pass through;
- a second connecting seat fixedly connected to the connecting frame and provided with a second through hole allowing the second shaft to pass through; and
- a drum arranged between the first connecting seat and the second connecting seat and rotatably connected to at least one thereof;
- wherein an end of the first shaft facing the drum is provided with a first thread, a first end of the drum is correspondingly provided with a first thread segment in a thread fit with the first thread, and the first shaft is located in the first through hole: an end of the second shaft facing the drum is provided with a second thread, and a second end of the drum is correspondingly provided with a second thread segment in a thread fit with the second thread, and the second shaft is located in the second through hole: a screwing direction of the first thread is opposite to that of the second thread.

In some embodiments, the driving mechanism further comprises:

- a first bearing, an inner ring of which is arranged to sleeve the drum;
- a first end cover with a first concave portion, and the first end cover is fixedly connected to an outer ring of the first bearing and the second connecting seat; and
- a second end cover with a second concave portion, and the second end cover is fixedly connected to the outer ring of the first bearing and the second connecting seat;

wherein the first concave portion and the second concave portion are spliced together to form a mounting cavity for accommodating the first bearing.

In some embodiments, an outer wall of the second end of the drum is provided with meshing teeth: the driving mechanism further comprises:

a gear located outside the drum and in the second through hole of the second connecting seat, the gear being meshed with the meshing teeth; and a gear shaft inserted into a through hole of the gear and rotatably connected to the second connecting seat.

In some embodiments, the number of teeth of the gear is smaller than that of the meshing teeth provided on the outer wall of the second end of the drum.

In some embodiments, one end of the gear shaft protrudes out of the second through hole of the second connecting seat, and a portion of the other end of the gear shaft located outside the second through hole is configured to be non-circular.

In some embodiments, the jackscrew mechanism further comprises:

a guiding mechanism comprising a first guiding member: the first guiding member comprises a first mounting end and a first protruding end which are fixedly connected; the first mounting end is mounted on the first connecting seat, and the first protruding end protrudes into the first through hole;

wherein an outer wall of the first shaft is provided with a first chute, a length direction of which is parallel with an axial direction of the first shaft: the first protruding end is inserted into the first chute.

In some embodiments, the guiding mechanism further comprises:

a second guiding member comprising a second mounting end and a second protruding end which are fixedly connected; the second mounting end is mounted on the second connecting seat, and the second protruding end protrudes into the second through hole;

wherein an outer wall of the second shaft is provided with a second chute, a length direction of which is parallel with an axial direction of the second shaft: the second protruding end is inserted into the second chute.

In some embodiments, the size of an end of the first shaft away from the drum is smaller than that of an end of the first shaft facing the drum; and/or the size of an end of the second shaft away from the drum is smaller than that of an end of the second shaft facing the drum.

In some embodiments, along a width direction of the auxiliary boom body, two sides of the connecting frame in a width direction thereof are provided with at least one group of the first connecting hole and the second connecting hole respectively; and the jackscrew mechanism is arranged between each group of the first connecting hole and the second connecting hole.

The embodiments of the present disclosure further provide a crane, comprising the auxiliary boom according to any of the technical solutions of the present disclosure.

In some embodiments, the crane according further comprises:

a main boom, a lateral portion of which is provided with a first bracket for fixing the auxiliary boom: the first bracket is provided with a pin hole;

a boom head of the main boom being provided with an insertion hole, a boom head of the auxiliary boom being provided with a first connecting hole and a second connecting hole, and the auxiliary boom being provided with a fixing hole at a position corresponding to the pin hole;

a first limiting mechanism located at a lateral portion of the boom head of the main boom to assist an auxiliary boom pin hole to be aligned with a main boom pin hole;

a second limiting mechanism located at the lateral portion of the main boom to assist the fixing hole to be aligned with the pin hole.

In some embodiments, the first limiting mechanism comprises:

a first bolt; and a stud connected to the lateral portion of the boom head of the main boom, the first bolt being in threaded connection with the stud.

In some embodiments, a first nut is provided between the first bolt and the stud.

In some embodiments, the stud is fixedly connected to the lateral portion of the boom head of the main boom.

In some embodiments, the second limiting mechanism comprises:

a second bolt in threaded connection with the lateral portion of the main boom.

In some embodiments, the second limiting mechanism further comprises:

a second nut provided on the second bolt.

In the above technical solution, the first limiting mechanism realizes a quick alignment between the main boom pin hole and the auxiliary boom pin hole, and reduces the difficulty in aligning the insertion hole of the main boom with the first connecting hole and the second connecting hole of the auxiliary boom, thereby improving the mounting efficiency of the auxiliary boom: the second limiting mechanism realizes a quick alignment between the auxiliary boom mounting hole and the pin hole of the first bracket, and reduces the difficulty in aligning the fixing hole of the auxiliary boom and the pin hole of the first bracket, thereby improving the dismounting efficiency of the auxiliary boom. The first limiting mechanism and the second limiting mechanism are reliable in structure, and the limiting position is adjusted conveniently.

The embodiments of the present disclosure further provide a method for unfolding an auxiliary boom, wherein the auxiliary boom is the auxiliary boom according to any of the technical solutions of the present disclosure, the method for unfolding the auxiliary boom comprising the steps of:

rotating the auxiliary boom around a first bracket until a first connecting hole and a second connecting hole on one side of the auxiliary boom in a width direction are aligned with insertion holes of the main boom, respectively: wherein two coaxial insertion holes are arranged on each side of the main boom in a width direction thereof; the first bracket is mounted on the main boom, and the auxiliary boom is rotatably connected to the first bracket, wherein the first bracket is fixed to the main boom;

driving a driving mechanism of the auxiliary boom so that the first shaft on the one side of the auxiliary boom in the width direction is inserted into the first connecting hole and one of the insertion holes, and the second shaft on the one side of the auxiliary boom in the width direction is inserted into the second connecting hole and the other of the insertion holes.

In some embodiments, the method for unfolding the auxiliary boom further comprises:

continuing to rotate the auxiliary boom until the first connecting hole and the second connecting hole on the other side of the auxiliary boom in the width direction are aligned with the insertion holes of the main boom, respectively;

driving the driving mechanism of the auxiliary boom so that the first shaft on the other side of the auxiliary boom in the width direction is inserted into the first connecting hole and one of the insertion holes, and the second shaft on the other side of the auxiliary boom in the width direction is inserted into the second connecting hole and the other of the insertion holes.

The embodiments of the present disclosure further provide a method for retracting an auxiliary boom, wherein the auxiliary boom is the auxiliary boom according to any of the technical solutions of the present disclosure, and the method for retracting the auxiliary boom comprises steps of:

driving a driving mechanism of a jackscrew mechanism on a side of the auxiliary boom away from the first bracket, so that a first shaft and a second shaft driven by the driving mechanism retract to disconnect the auxiliary boom from a main boom;

continuing to rotate the auxiliary boom until the auxiliary boom is close to a first bracket of the main boom;

connecting the auxiliary boom with the first bracket;

continuing to rotate the auxiliary boom so that the auxiliary boom is close to a second bracket of the main boom, wherein the second bracket and the first bracket are arranged at an interval;

driving the driving mechanism of the jackscrew mechanism on a side close to the first bracket, so that the first shaft and the second shaft driven by the driving mechanism retract, and the auxiliary boom is completely disconnected from the main boom;

connecting the auxiliary boom with the second bracket.

In the above technical solution, the auxiliary boom is provided with an auxiliary boom body and a jackscrew mechanism, a connecting frame of the auxiliary boom body is cooperated with a first shaft and a second shaft of the jackscrew mechanism, and the auxiliary boom is mounted and dismounted through simultaneous extension and simultaneous retraction of the first shaft and the second shaft, so that the operation is very convenient. In addition, mounting and dismounting of the first shaft and the second shaft are realized by one operation, and the mounting efficiency is at least doubled.

DESCRIPTION OF THE INVENTION

Next, the technical solutions provided by the present disclosure will be described in detail with reference to FIGS. 1 to 19.

Explanation of nouns and terms used herein.

Main boom: also known as a main erecting boom. The main boom is a telescopic arm on the crane for hoisting, which consists of 3 to 7 sections of arms. The basic arm of the main boom is an outermost section thereof and remains unchanged when the main boom protrudes and retracts. The tail arm of the main boom is an innermost section thereof, which is at a highest position when the main boom protrudes, and connected to a hook for hoisting operation. One or more sections of intermediate arms are disposed between the basic arm and the tail arm of the main boom.

Auxiliary boom: also known as an auxiliary erecting boom, which is mounted on the arm head of the tail arm of the main boom to protrude the length of the crane jib and achieve a greater lifting height.

The inventors have found that the related art at least has the following defects; in the existing process of mounting the auxiliary boom to the main boom, due to the limitation of machining errors, it is difficult to accurately align the auxiliary boom mounting hole with the main boom connecting hole, which makes it difficult to insert and pull out the pins, and usually a copper hammer is required for knocking. The position of the arm head is high, especially the position of the upper pin is high, so the operator has to stand on a climbing ladder to complete the dismounting operation of the pins, which leads to a low mounting efficiency and an inconvenient operation.

Figure 1:
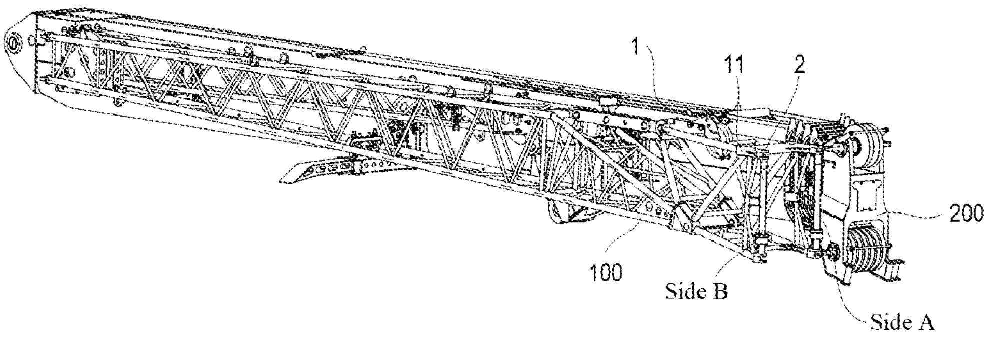
FIG. 1 is a schematic diagram of a connection state between an auxiliary boom and a main boom according to some embodiments of the present disclosure.

To this end, referring to FIG. 1, some embodiments of the present disclosure provide an auxiliary boom 100 to protrude a jib length of a crane. When necessary, the auxiliary boom 100 is mounted on an arm head of a tail arm of a main boom 200 of the crane, so that the length of the whole boom is increased. After use, the auxiliary boom 100 is dismounted from the arm head of the tail arm of the main boom 200 and mounted onto a side surface of the main boom 200. The auxiliary boom 100 according to the embodiment of the present disclosure simplifies mounting and dismounting actions between the auxiliary boom 100 and the main boom 200, so that mounting and dismounting operations of the auxiliary boom of the crane are more convenient, reliable and efficient.

Figure 2:
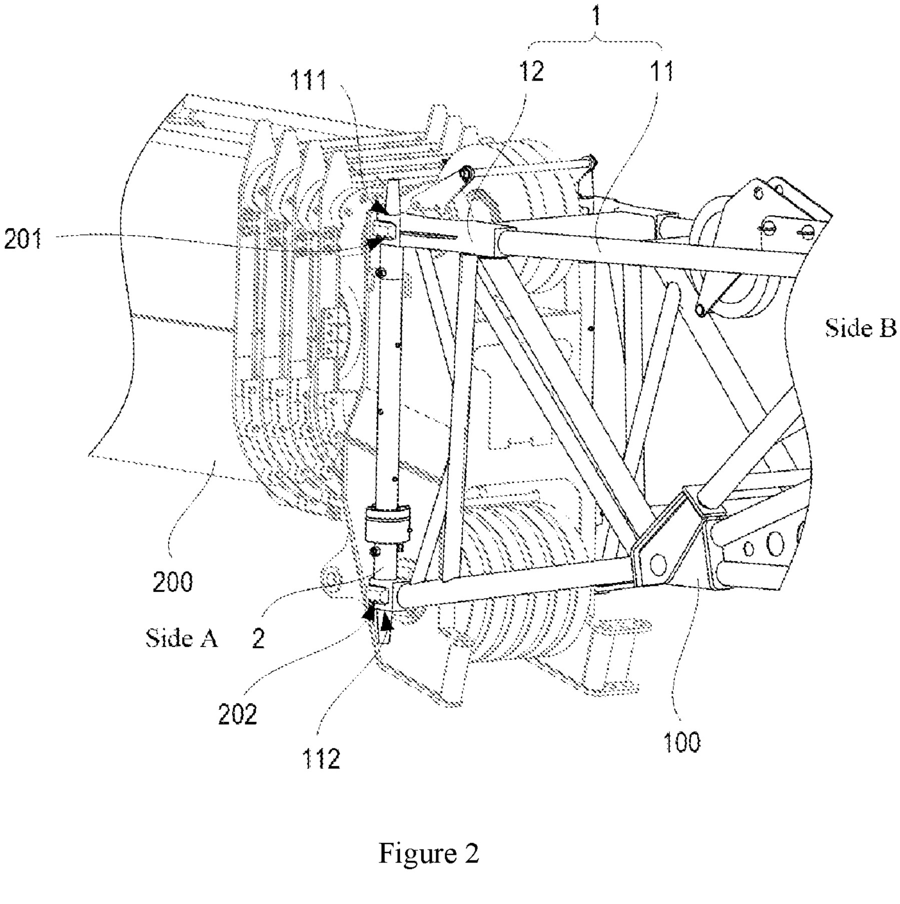
FIG. 2 is a partially enlarged view of an auxiliary boom and a main boom at a connecting frame in a connection state according to some embodiments of the present disclosure.
Figure 3:
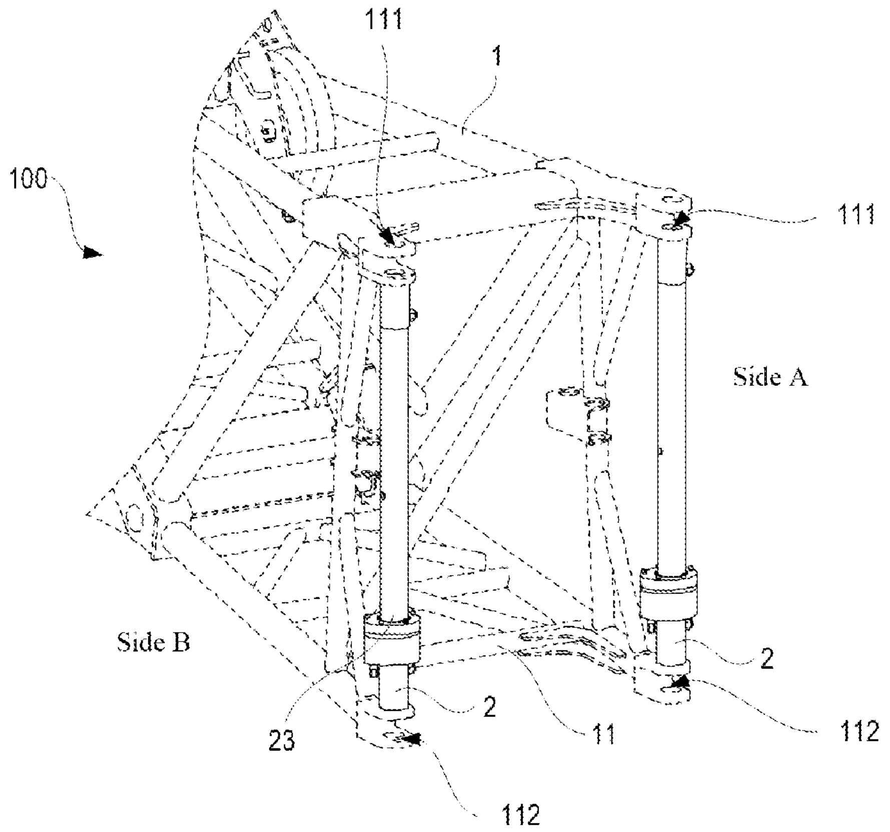
FIG. 3 is a partially enlarged view of an auxiliary boom at a connecting frame according to some embodiments of the present disclosure.
Figure 4:
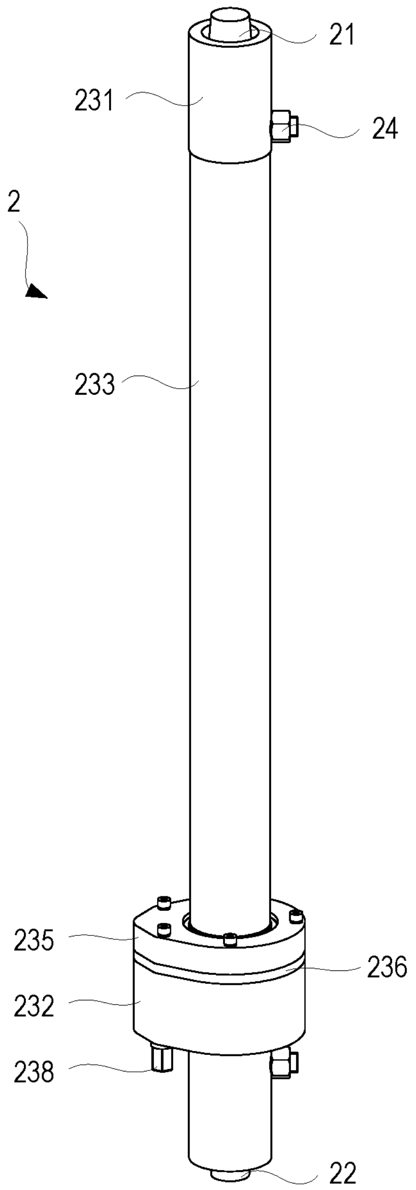
FIG. 4 is a stereo view of a jackscrew mechanism of an auxiliary boom according to some embodiments of the present disclosure.
Figure 5:
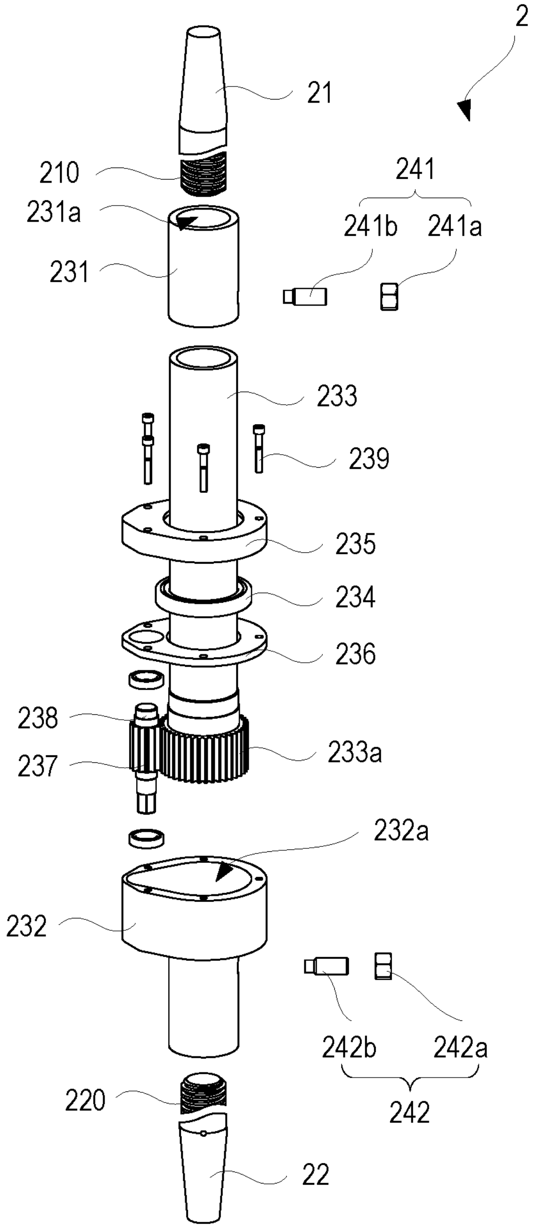
FIG. 5 is an exploded state view of a jackscrew mechanism of an auxiliary boom according to some embodiments of the present disclosure.
Figure 6:
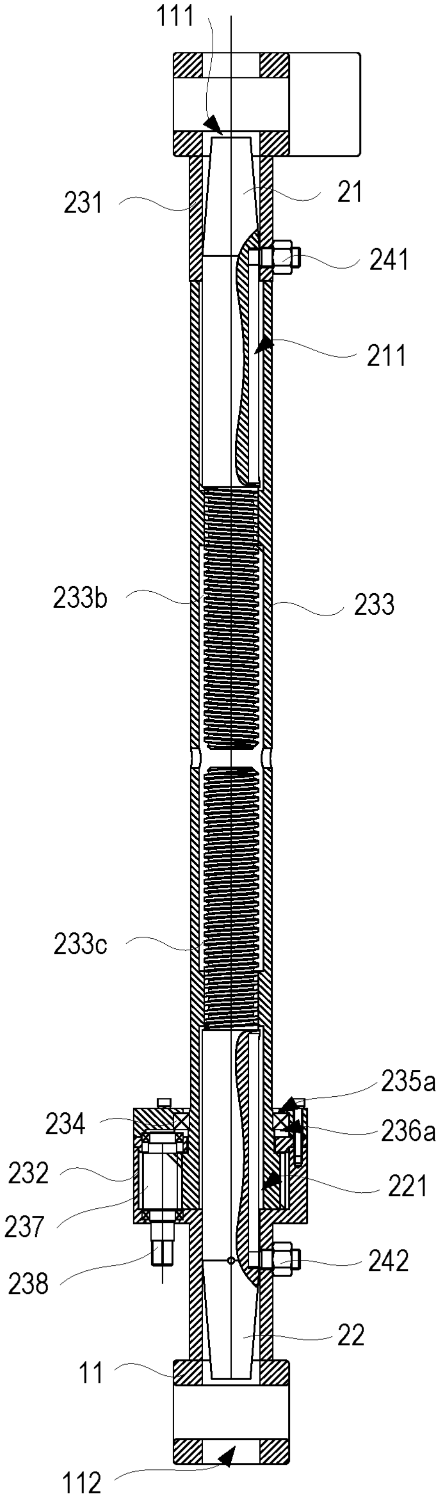
FIG. 6 is a cross-sectional view of a jackscrew mechanism of an auxiliary boom in a retracted state according to some embodiments of the present disclosure.
Figure 7:
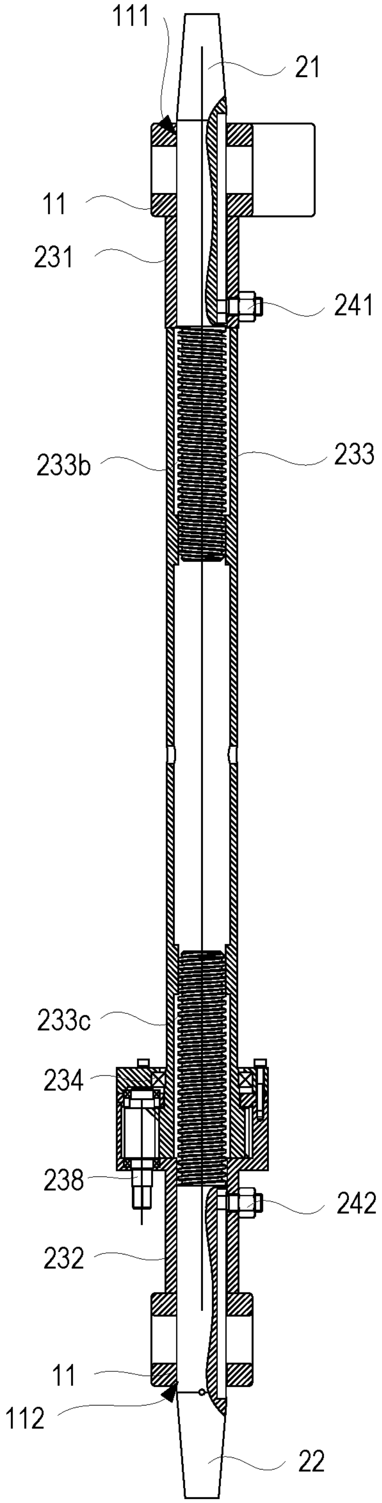
FIG. 7 is a cross-sectional view of a jackscrew mechanism of an auxiliary boom in a protruded state according to some embodiments of the present disclosure.

Referring to FIGS. 1 to 3, the auxiliary boom 100 includes an auxiliary boom body 1 and a jackscrew mechanism 2. The auxiliary boom body 1 includes a connecting frame 11 with a first connecting hole 111 and a second connecting hole 112 which are coaxially arranged. Referring to FIGS. 4 and 5, the jackscrew mechanism 2 includes a first shaft 21, a second shaft 22 and a driving mechanism 23. The first shaft 21 and the second shaft 22 are both arranged between the first connecting hole 111 and the second connecting hole 112 and coaxial with the first connecting hole 111. The driving mechanism 23 is in driving connection with the first shaft 21 and the second shaft 22 to drive the first shaft 21 and the second shaft 22 to protrude simultaneously and retract simultaneously. Referring to FIG. 7, when the first shaft 21 is in a protruded state, the first shaft 21 is inserted into the first connecting hole 111. Referring to FIG. 6, when the first shaft 21 is in a retracted state, the first shaft 21 leaves the first connecting hole 111. Referring to FIG. 7, when the second shaft 22 is in the protruded state, the second shaft 22 is inserted into the second connecting hole 112. Referring to FIG. 6, when the second shaft 22 is in the retracted state, the second shaft 22 leaves the second connecting hole 112.

The auxiliary boom body 1 includes a boom frame 12 and a connecting frame 11, and the length and size of the boom frame 12 are set as required. The connecting frame 11 is located at an end of the boom frame 12. The main boom 200 and the auxiliary boom 100 are connected to each other through the connecting frame 11. When the auxiliary boom 100 is required to work, the main boom 200 and the auxiliary boom 100 are connected together. When the auxiliary boom 100 is not required to work, the main boom 200 and the auxiliary boom 100 are disconnected, and then the auxiliary boom 100 is mounted on a side surface of the main boom 200.

Referring to FIGS. 2 and 3, in some embodiments, along a width direction of the auxiliary boom body 1, two sides of the connecting frame 11 are provided with at least one group of the first connecting hole and the second connecting hole respectively. The jackscrew mechanism 2 is arranged between each group of the first connecting hole 111 and the second connecting hole 112.

Referring to FIGS. 2 and 3, the connecting frame 11 is substantially a rectangular frame, each corner of which is provided with a protrusion, and each protrusion has one or two connecting holes. Taking a direction where the connecting frame 11 is in a use state, i.e., a direction shown in FIG. 3, as an example, in which the connecting hole at a top is the first connecting hole 111 and the connecting hole at a bottom is the second connecting hole 112. The first connecting hole 111 corresponds to an insertion hole in a corresponding position on the main boom 200, i.e., a first insertion hole 201; the first connecting hole 111 also corresponds to the first shaft 21. The second connecting hole 112 corresponds to another insertion hole in a corresponding position on the main boom 200, i.e., a second insertion hole 202. The second connecting hole 112 also corresponds to the second shaft 22.

The first shaft 21 and the second shaft 22 protrude simultaneously and retract simultaneously. For the convenience of description, two sides of the auxiliary boom 100 in the width direction are marked as side A and side B. In which, the first shaft 21 and the second shaft 22 on the side A enter the protruded state simultaneously, and enter the retracted state simultaneously. The first shaft 21 and the second shaft 22 on the side B enter the protruded state simultaneously, and enter the retracted state simultaneously. The side A corresponds to a side of the main boom 200 close to a first bracket, and the side B corresponds to a side of the main boom 200 away from the first bracket. When the auxiliary boom 100 is to be mounted, the first shaft 21 and the second shaft 22 on the side A protrude firstly, and the first shaft 21 and the second shaft 22 on the side B protrude later. When the auxiliary boom 100 is to be dismounted, the first shaft 21 and the second shaft 22 on the side B retract firstly, and the first shaft 21 and the second shaft 22 on the side A retract later.

Referring to FIGS. 2 and 3, the side A and the side B of the auxiliary boom 100 in the width direction are provided with one jackscrew mechanisms 2, respectively. As described above, the connecting frame 11 is substantially rectangular. One jackscrew mechanism 2 is arranged between the two protrusions of the connecting frame 11 on the side A. One jackscrew mechanism 2 is also arranged between the two protrusions on the side B of the connecting frame. The two jackscrew mechanisms 2 are implemented in the same way.

Referring to FIGS. 2, 4 and 5, the jackscrew mechanism 2 includes a first shaft 21 and a second shaft 22 which are coaxially arranged. When the auxiliary boom 100 is in a mounted state, axes of the first shaft 21 and the second shaft 22 of the jackscrew mechanism 2 on the side A are coaxial with the first connecting hole 111, the second connecting hole 112 and the first insertion hole 201 on the side A, and axes of the first shaft 21 and the second shaft 22 of the jackscrew mechanism 2 on the side B are coaxial with the first connecting hole 111, the second connecting hole 112 and the second insertion hole 202 on the side B. The first shaft 21 and the second shaft 22 of each of the jackscrew mechanisms 2 act simultaneously, i.e., protrude simultaneously and retract simultaneously. A linkage mechanism is used to realize the synchronous action of the first shaft 21 and the second shaft 22.

Referring to FIGS. 3 to 7, specifically, the driving mechanism 23 of the jackscrew mechanism 2 adopts the following implementation.

Referring to FIGS. 3 to 7, in some embodiments, the driving mechanism 23 includes a first connecting seat 231, a second connecting seat 232 and a drum 233.

The first connecting seat 231 is fixedly connected to the connecting frame 11 and provided with a first through hole 231*a*. The first connecting seat 231 is welded and fixed with the protrusion on the top of the connecting frame 11 shown in FIG. 3. The protrusion is provided with the first connecting hole 111. The first through hole 231*a* of the first connecting seat 231 and the first connecting hole 111 of the protrusion are always coaxial regardless of whether the auxiliary boom 100 is in a use state or a standby state. The first shaft 21 protrudes and retracts in the first through hole 231*a*. When protruding out of the first through hole 231*a* and continuing protruding, the first shaft 21 is inserted into the first connecting hole 111. During retraction, the first shaft 21 retracts from the first connecting hole 111 into the first through hole 231*a*.

The second connecting seat 232 is also fixedly connected to the connecting frame 11 and provided with a second through hole 232*a*. The second connecting seat 232 is welded and fixed with the protrusion on the bottom of the connecting frame 11 shown in FIG. 3. The protrusion on the bottom is provided with the second connecting hole 112. The second through hole 232*a* of the second connecting seat 232 and the second connecting hole 112 of the protrusion on the bottom are always coaxial regardless of whether the auxiliary boom 100 is in a use state or a standby state. The second shaft 22 protrudes and retracts in the second through hole 232*a*. When protruding out of the second through hole 232*a* and continuing protruding, the second shaft 22 is inserted into the second through hole 232*a*. During retraction, the second shaft 22 retracts from the second connecting hole 112 into the second through hole 232*a*.

The drum 233 is arranged between the first connecting seat 231 and the second connecting seat 232 and rotatably connected to at least one thereof. In which, an end of the first shaft 21 facing the drum 233 is provided with a first thread 210, and a first end of the drum 233 is correspondingly provided with a first thread segment 233*b* in a thread fit with the first thread 210. The first shaft 21 is located in the first through hole 231*a*. An end of the second shaft 22 facing the drum 233 is provided with a second thread 220, and a second end of the drum 233 is correspondingly provided with a second thread segment 233*c* in a thread fit with the second thread 220. A screwing direction of the first thread 210 is opposite to that of the second thread 220.

When the drum 233 is rotated in a first direction, the first shaft 21 and the second shaft 22 protrude simultaneously. When the drum 233 is rotated in a second direction, the first shaft 21 and the second shaft 22 retract simultaneously. The first direction is opposite to the second direction.

In the above technical solution, the drum 233 is rotated by an external force to drive the first shaft 21 and the second shaft 22 to move up and down linearly. Moreover, the first shaft 21 and the second shaft 22 are pushed to protrude and retract with a small force due to a thread rotation with a small lead angle of the threads, so that the mounting process is smooth and labor-saving, and the driving mechanism 23 is small in size, stable and reliable in action, and very convenient to operate.

Still referring to FIGS. 4 to 7, in some embodiments, the drive mechanism 23 further includes a first bearing 234, a first end cap 235, and a second end cap 236. An inner ring of the first bearing 234 is arranged to sleeve the drum 233.

The first end cap 235 has a first concave portion 235*a*, and the first end cap 235 is fixedly connected to an outer ring of the first bearing 234 and the second connecting seat 232.

The second end cover 236 has a second concave portion 236*a*, and the second end cover 236 is fixedly connected to the outer ring of the first bearing 234 and the second connecting seat 232. In which, the first concave portion 235*a* and the second concave portion 236*a* are spliced together to form a mounting cavity P for accommodating the first bearing 234. During the rotation of the drum 233, only the first bearing 234, rather than the first end cap 235 and the second end cap 236, rotates with the drum 233. The first end cover 235 and the second end cover 236 serve to protect the first bearing 234, prevent foreign matters from entering the first bearing 234, and avoid any danger to the operator caused by the rotation of the first bearing 234.

The first end cover 235, the second end cover 236 and the second connecting seat 232 are fixedly connected by a plurality of connecting bolts 239, so that the structure of the whole jackscrew mechanism 2 is more stable.

In the above technical solution, a rotatable connection between the drum 233 and the second connecting seat 232 is realized by the bearing. It is unnecessary to separately provide a rotatable connecting mechanism between the first connecting seat 231 and the drum 233, and the whole jackscrew mechanism 2 is compact in structure and reliable in action, so that the rotation process is flexible and labor-saving.

Still referring to FIGS. 4 to 7, how to simply and easily rotate the drum 233 will be described below. In some embodiments, an outer wall of the second end of the drum 233 is provided with meshing teeth 233*a*: the driving mechanism 23 further includes a gear 237 and a gear shaft 238: the gear 237 is located outside the drum 233 and in the second through hole 232*a* of the second connecting seat 232: the gear 237 is meshed with the meshing teeth 233*a*: the gear shaft 238 is inserted into a through hole of the gear 237 and rotatably connected to the second connecting seat 232; and the number of teeth of the gear 237 is smaller than that of the meshing teeth 233*a* provided on the outer wall of the second end of the drum 233, which further decreases the input force and reduces the difficulty in mounting and dismounting the auxiliary boom 100. In the above technical solution, the drum 233 is rotated just by rotating the gear 237, so that the rotation of the drum 233 is more convenient.

Figure 8:
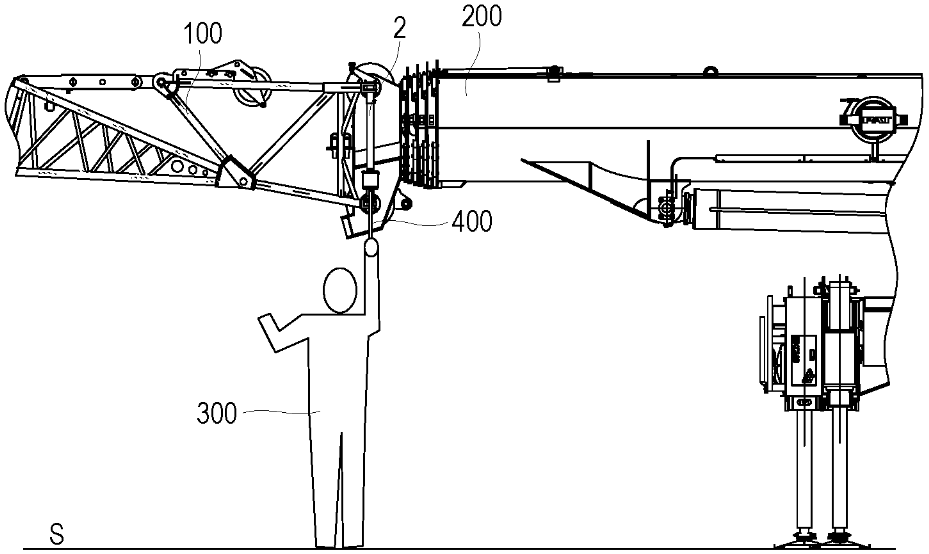
FIG. 8 is a schematic diagram of an operator's operation on a jackscrew mechanism of an auxiliary boom according to some embodiments of the present disclosure.
Figure 9:
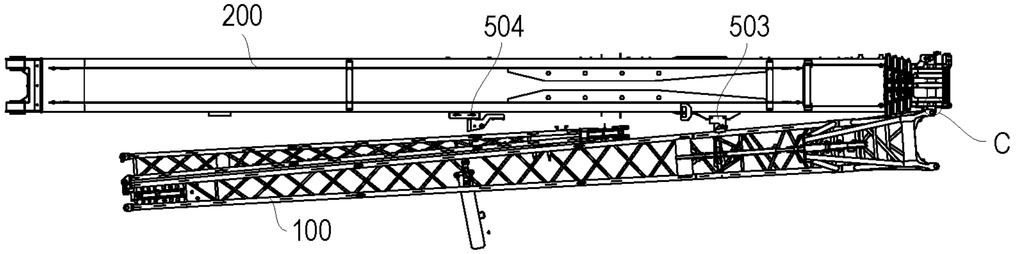
FIG. 9 is a schematic diagram of a unilateral connection state between a main boom and an auxiliary boom of a crane according to some embodiments of the present disclosure.
Figure 10:
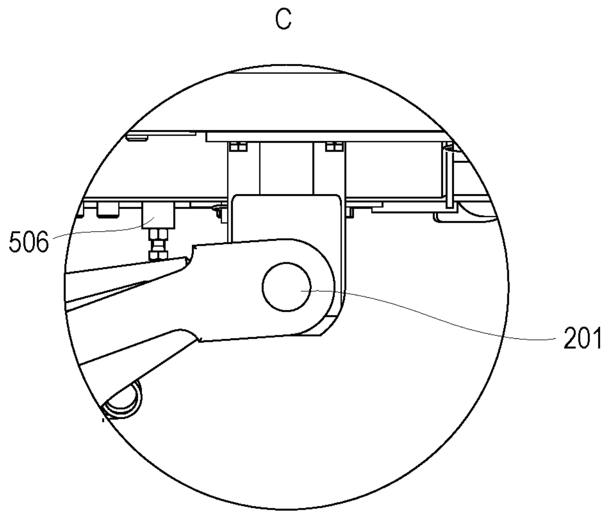
FIG. 10 is an enlarged view of part C of FIG. 9.
Figure 11:
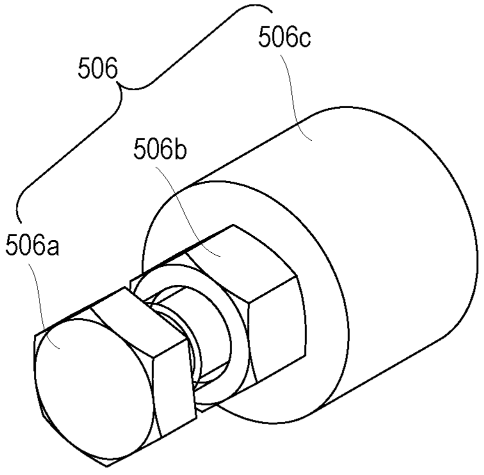
FIG. 11 is a schematic diagram of a first limiting mechanism of a crane according to some embodiments of the present disclosure.
Figure 12:
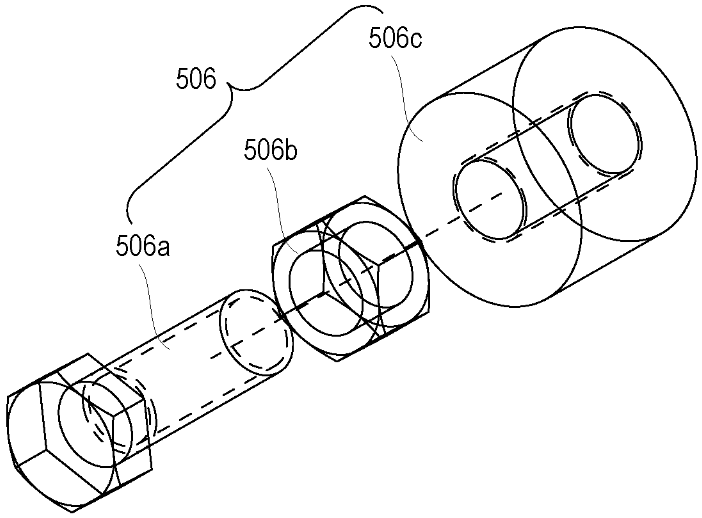
FIG. 12 is an exploded view of a first limiting mechanism of a crane according to some embodiments of the present disclosure.
Figure 13:
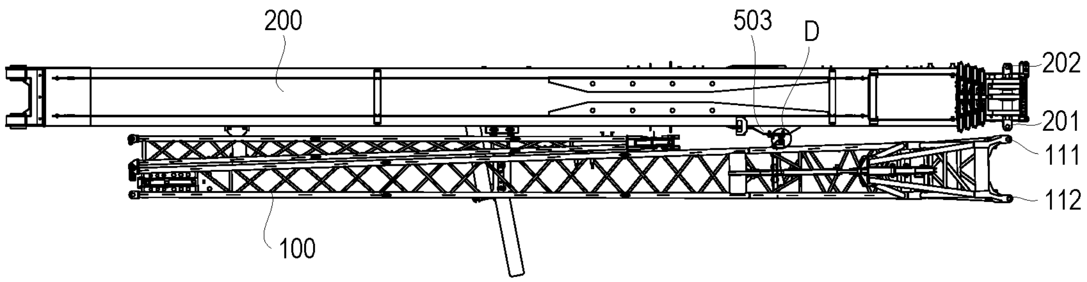
FIG. 13 is a schematic diagram of a retracted state of an auxiliary boom of a crane according to some embodiments of the present disclosure.
Figure 14:
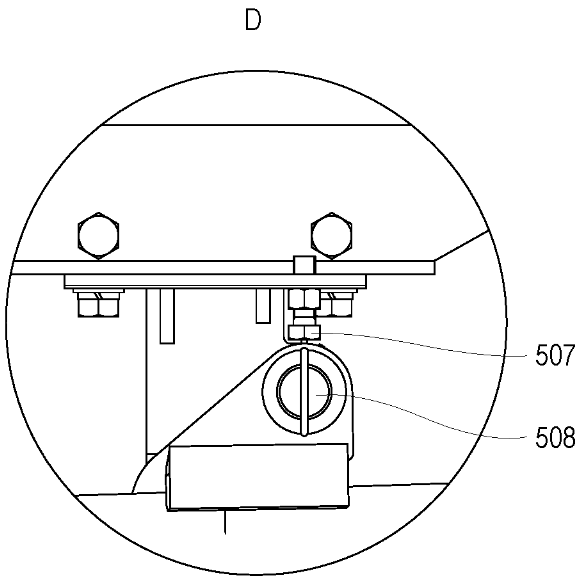
FIG. 14 is an enlarged view of part D of FIG. 13.
Figure 15:
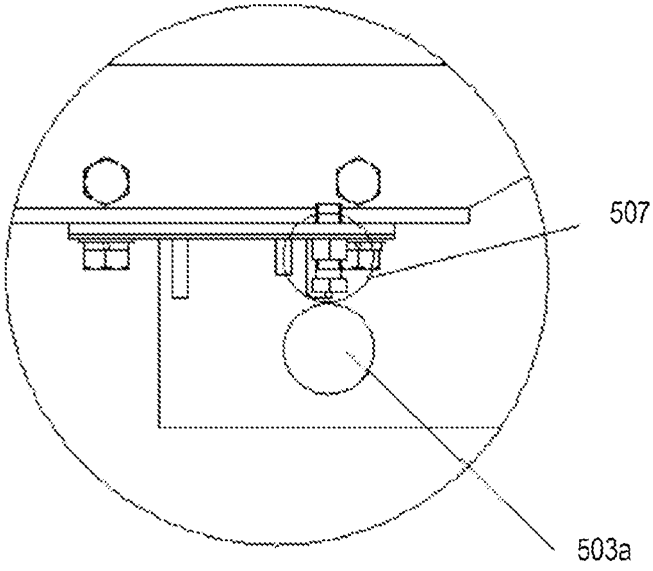
FIG. 15 is a schematic diagram of a pin hole of a first bracket corresponding to part D.
Figure 16:
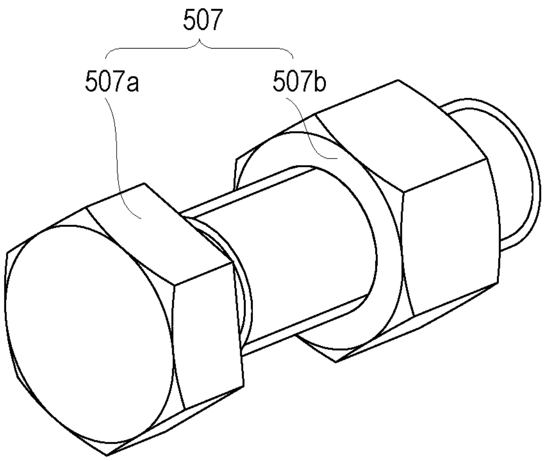
FIG. 16 is a schematic diagram of a second limiting mechanism of a crane according to some embodiments of the present disclosure.
Figure 17:
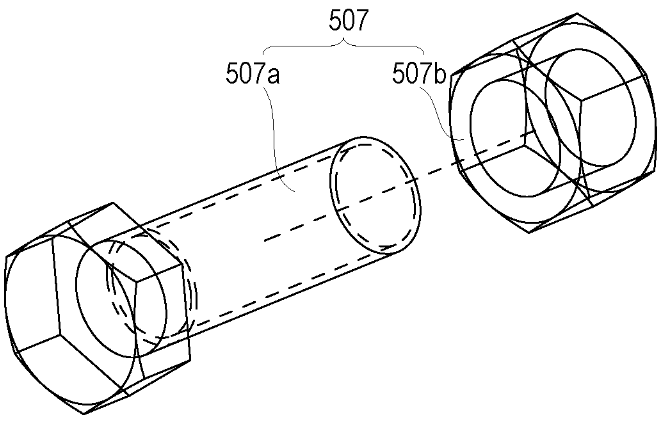
FIG. 17 is an exploded view of a second limiting mechanism of a crane according to some embodiments of the present disclosure.

In some embodiments, one end of the gear shaft 238 protrudes out of the second through hole 232*a* of the second connecting seat 232, and a portion of the gear shaft 238 located outside the second through hole 232*a* is configured to be non-circular. A tool such as an electric wrench is used to rotate the gear shaft 238, and the portion of the gear shaft 238 outside the second through hole 232*a* is configured to be non-circular, so that the gear shaft 238 is easy to be stressed and not easy to slip during rotation. The portion of the gear shaft 238 outside the second through hole 232*a* is also designed in the form of an external hexagon, which is driven by tools such as a universal electric wrench and the use is convenient. Moreover, the gear shaft 238 is located at an end of the second connecting seat 232 away from the first connecting seat 231, i.e., the gear shaft 238 is at a lower position, so that the operators complete the mounting of the auxiliary boom 100 on the ground without climbing, thereby avoiding the danger caused by climbing. As shown in FIG. 8, an operator 300 standing on the ground S operates the jackscrew mechanism 2 using an electric wrench 400.

Still referring to FIGS. 4 to 7, both the first shaft 21 and the second shaft 22 are in threaded fit with the drum 233. During the rotation of the drum 233, there is a rotation of first shaft 21 and the second shaft 22, and in order to reduce this situation and enable the first shaft 21 to stably move up and down linearly, in some embodiments, the jackscrew mechanism 2 further includes a guide mechanism 24. The guiding mechanism 24 includes a first guiding member 241, and the first guiding member 241 includes a first mounting end 241*a* and a first protruding end 241*b* which are fixedly connected. The first mounting end 241*a* is, for example, a nut. The first protruding end 241*b* is, for example, a bolt. The first mounting end 241*a* is mounted on the first connecting seat 231, and the first protruding end 241*b* protrudes into the first through hole 231*a*. In which, an outer wall of the first shaft 21 is provided with a first chute 211, a length direction of which is parallel with an axial direction of the first shaft 21, and the protruding end of the first guiding member 241 is inserted into the first chute 211. The first guiding member 241 is, for example, a bolt, which is fixedly mounted on the first connecting seat 231. During the linear movement of protruding and retracting by the first shaft 21, the bolt is fixed. The protruding end of the bolt is always located in the first chute 211 of the first shaft 21 to ensure that the first shaft 21 protrudes and retracts linearly.

Referring to FIG. 5, in some embodiments, the guiding mechanism 24 includes a second guiding member 242, which includes a second mounting end 242*a* mounted on the second connecting seat 232 and a second protruding end 242*b* protruding into the second through hole 232*a*. In which, an outer wall of the second shaft 22 is provided with a second chute 221, a length direction of which is parallel with an axial direction of the second shaft 22, and the second protruding end 242*b* of the second guiding member 242 is inserted into the second chute 221. The second guiding member 242 is, for example, a bolt, which is fixedly mounted on the second connecting seat 232. During the linear movement of protruding and retracting by the second shaft 22, the bolt is fixed. The protruding end of the bolt is always located in the second chute 221 of the second shaft 22 to ensure that the second shaft 22 protrudes and retracts linearly.

Referring to FIGS. 4 to 7, in some embodiments, a size of an end of the first shaft 21 away from the drum 233 is smaller than that of the end of the first shaft 21 facing the drum 233. The end of the first shaft 21 is sharp to facilitate insertion into the first connecting hole 111.

Still referring to FIGS. 4 to 7, a size of an end of the second shaft 22 away from the drum 233 is smaller than that of the end of the second shaft 22 facing the drum 233. The end of the second shaft 22 is sharp to facilitate insertion into the second connecting hole 112.

Referring to FIGS. 9 to 17, the embodiments of the present disclosure further provide a crane, including the auxiliary boom 100 according to any technical solution of the present disclosure.

The crane with double limiting mechanisms includes a main boom 200, an auxiliary boom 100, a first limiting mechanism 506 and a second limiting mechanism 507.

A lateral portion of the main boom 200 is provided with a first bracket 503 for fixing the auxiliary boom 100. The first bracket 503 is provided with a pin hole 503*a*. A boom head of the main boom 200 is provided with an insertion hole, and a boom head of the auxiliary boom 100 is provided with a first connecting hole 111 and a second connecting hole 112. The auxiliary boom 100 is provided with a fixing hole 508 at a position corresponding to the pin hole 503*a*.

The first limiting mechanism 506 is located at a lateral portion of the boom head of the main boom 200 to assist the first connecting hole 111 and the second connecting hole 112 to be aligned with corresponding insertion holes respectively. The second limiting mechanism 507 is located at the lateral portion of the main boom 200 to assist the fixing hole 508 to be aligned with the pin hole 503*a*.

When the auxiliary boom 100 is to be mounted to the main boom 200, the pin hole 503*a* is connected to the fixing hole 508 through a pin (not shown), and the auxiliary boom 100 rotates around the pin under the action of external force. Under the action of the first limiting mechanism 506, the first connecting hole 111 and the second connecting hole 112 are quickly and accurately aligned with corresponding insertion holes respectively, i.e., the alignment on the side A is realized, as shown in FIG. 1. After the alignment on the side A is realized, the jackscrew mechanism 2 on the side A is started to realize the connection between the auxiliary boom 100 and the main boom 200 on the side A. Next, the auxiliary boom 100 is disconnected from the first bracket 503, and the auxiliary boom 100 continues to rotate to realize the alignment on the side B. After the alignment on the side B is realized, the jackscrew mechanism 2 on the side B is started to realize the connection between the auxiliary boom 100 and the main boom 200 on the side B.

When the auxiliary boom 100 is to be dismounted from the main boom 200, the jackscrew mechanism 2 on the side B is started firstly to disconnect the auxiliary boom 100 from the main boom 200 on the side B. Then, under the action of external force, the auxiliary boom 100 rotates to a lateral side of the main boom 200 around the pin of side A of the boom head of the main boom 200. Under the action of the second limiting mechanism 507, the fixing hole 508 is quickly and accurately aligned with the pin hole 503*a*, as shown in FIGS. 13 to 17.

In some embodiments, the first limiting mechanism 506 includes a first bolt 506*a* and a stud 506*c*. The stud 506*c* is connected to the lateral portion of the boom head of the main boom 200: the first bolt 506*a* is in threaded connection with the stud 506*c*, and a first nut 506*b* is provided between the first bolt 506*a* and the stud 506*c*.

During use, the height of the first bolt 506*a* is adjusted, and the first nut 506*b* locks the first bolt 506*a* to prevent the first nut 506*b* from rotating to be offset during mounting. At this time, when the auxiliary boom 100 abuts against the first bolt 506*a*, an auxiliary boom pin hole 5 of the auxiliary boom 100 is aligned with a main boom pin hole 4 of the main boom 200 to facilitate the pin connection, so that the auxiliary boom 100 is connected to the main boom 200 conveniently and quickly, thereby avoiding the problem that the auxiliary boom pin hole 5 does not be quickly and accurately aligned with the pin hole 4 of the main boom in the related art.

In some embodiments, the second limiting mechanism 507 includes a second bolt 507*a* and a second nut 507*b*. The second bolt 507*a* is in threaded connection with the lateral portion of the main boom 200, and the second bolt 507*a* is connected to the second nut 507*b*.

During the retraction of the auxiliary boom 100, the second bolt 507*a* is adjusted to a proper position, so that the auxiliary boom 100 rotates along the first connecting hole 111 and the second connecting hole 112 on the side A, and the fixing hole 508 is quickly and accurately aligned with the pin hole 503*a* under the blocking limitation by the second bolt 507*a*.

In some embodiments, the first limiting mechanism 506 adjusts a screwing depth of the stud 506*c* through the first bolt 506*a*, and adjusts the first connecting hole 111 and the second connecting hole 112 to be aligned with corresponding insertion holes respectively, so that the first connecting hole 111 and the second connecting hole 112 are directly connected to corresponding insertion holes respectively by the pins. The second limiting mechanism 507 adjusts the alignment between the fixing hole 508 and the pin hole 503*a* by adjusting the screwing depth of the second bolt 507*a* into the lateral portion of the main boom 200. The first limiting mechanism 506 and the second limiting mechanism 507 are simple and reliable in structure so that on the one hand, the operation is simple and the adjustment is quick, and on the other hand, it is convenient to adjust the length in time according to the position of the pin hole 503*a* to change the limiting position.

Figure 18:
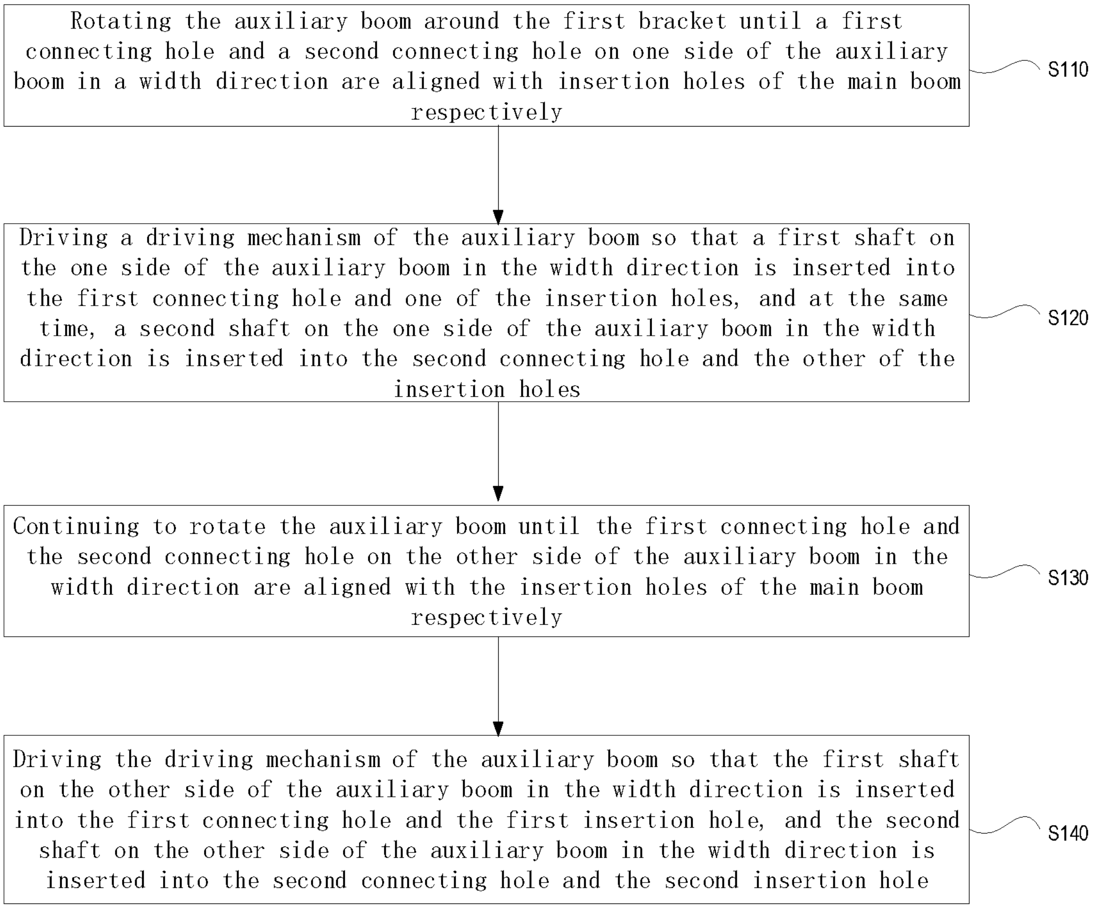
FIG. 18 is a flowchart of a method for unfolding an auxiliary boom according to other embodiments of the present disclosure.

Referring to FIG. 18, some embodiments of the present disclosure further provides a method for unfolding an auxiliary boom, wherein the auxiliary boom 100 is the auxiliary boom 100 according to any technical solution of the present disclosure and used for a crane. A main boom 200 of the crane includes a first bracket 503 and a second bracket 504 which are separately arranged in a length direction of the main boom 200 and located at a lateral surface of the main boom 200. The method for unfolding the auxiliary boom includes the following steps:

Step S110: rotating the auxiliary boom 100 around the first bracket 503 until a first connecting hole 111 and a second connecting hole 112 on one side of the auxiliary boom 100 in a width direction are aligned with insertion holes of the main boom 200 respectively. In which, two coaxial insertion holes are arranged on each side of the main boom 200 in a width direction thereof, i.e., two first insertion holes 201 on a side A and a second insertion hole 202 on the side A are coaxial, and two first insertion holes 201 on a side B and a second insertion holes 202 on the side B are coaxial. The first bracket is mounted on the main boom 200, and the auxiliary boom 100 is rotatably connected to the first bracket.

Step S120: driving a driving mechanism 23 of the auxiliary boom 100 so that a first shaft 21 on the one side of the auxiliary boom 100 in the width direction is inserted into the first connecting hole 111 and one of the insertion holes, and at the same time, a second shaft 22 on the one side of the auxiliary boom 100 in the width direction is inserted into the second connecting hole 112 and the other of the insertion holes. That is, the first shaft 21 and the second shaft 22 on the side A protrude simultaneously, so that the first shaft 21 is inserted into the first insertion hole 201 on the side A and the first connecting hole 111, and the second shaft 22 is inserted into the second insertion hole 202 on the side A and the second connecting hole 112.

The step of inserting the first shaft 21 and the second shaft 22 is as follows: when the auxiliary boom 100 is to be mounted, the auxiliary boom 100 is rotated into the first connecting hole 111 thereof. After the connecting holes 112 are aligned with the first insertion holes of the main boom 200, a gear 237 is rotated by a manual or automatic tool to drive a drum 233 to rotate. Threads on an inner side of the drum 233 push the first shaft 21 and the second shaft 22 to protrude up and down simultaneously and penetrate into the first connecting hole 111, the second connecting hole 112 and the first insertion hole, thereby locking of the auxiliary boom 100 on the side A. Next, the auxiliary boom 100 continues to be pushed to rotate around a jackscrew shaft on the side A to complete the mounting of the first shaft 21 and the second shaft 22 of a jackscrew mechanism 2 on the side B, thereby locking of the auxiliary boom 100.

Still referring to FIG. 18, in some embodiments, the method for unfolding the auxiliary boom further includes the following steps:

Step S130: continuing to rotate the auxiliary boom 100 until the first connecting hole 111 and the second connecting hole 112 on the other side of the auxiliary boom 100 in the width direction, i.e., on the side B, are aligned with the insertion holes of the main boom 200, respectively. That is, the first connecting hole 111 on the side B is aligned with the first insertion hole 201 of the main boom 200 on the side B, and the second connecting hole 112 on the side B is aligned with the second insertion hole 202 of the main boom 200 on the side B.

Step S140: driving the driving mechanism 23 of the auxiliary boom 100 so that the first shaft 21 on the other side of the auxiliary boom 100 in the width direction, i.e., on the side B, is inserted into the first connecting hole 111 and the first insertion hole 201, and the second shaft 22 (on the other side of the auxiliary boom 100 in the width direction) is inserted into the second connecting hole 112 and the second insertion hole 202.

The above technical solution realizes the convenient mounting of the main boom 200 and the auxiliary boom 100.

Figure 19:
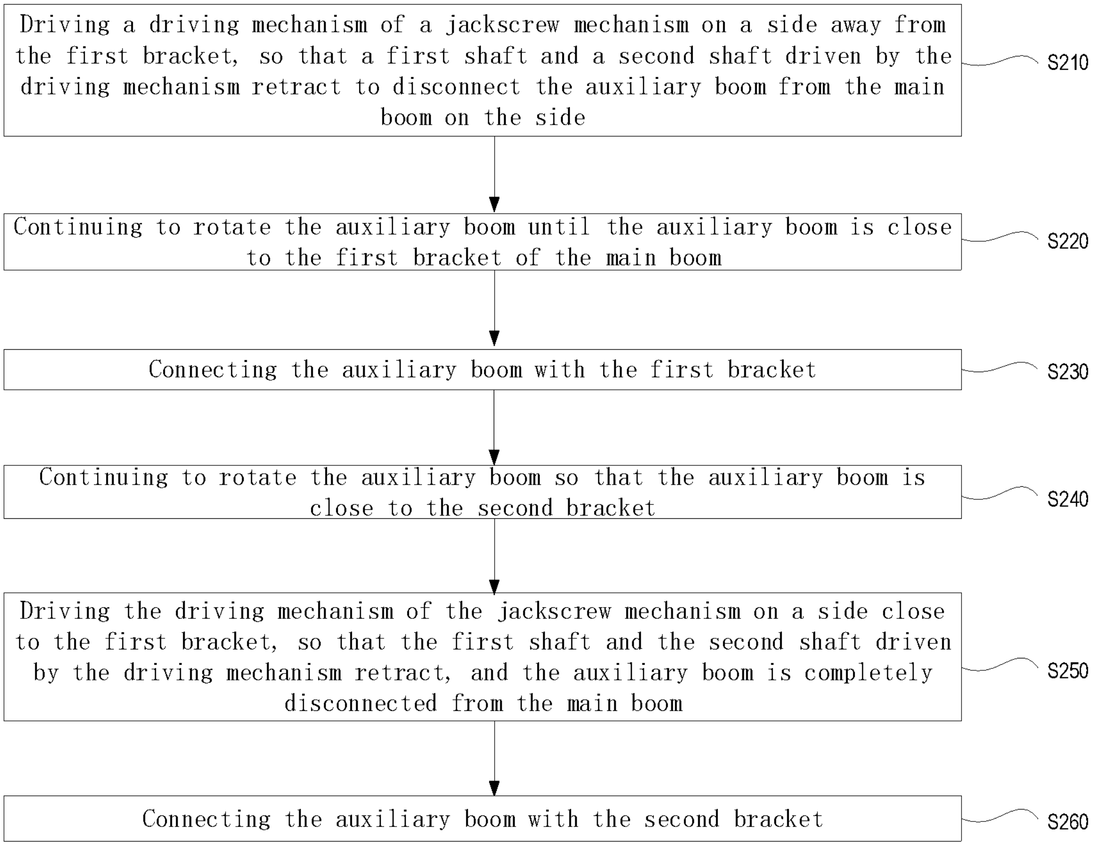
FIG. 19 is a flowchart of a method for retracting an auxiliary boom according to further embodiments of the present disclosure.

Referring to FIG. 19, some embodiments of the present disclosure further provides a method for retracting an auxiliary boom, and the auxiliary boom is the auxiliary boom 100 according to any technical solution of the present disclosure and used for a crane. A main boom 200 of the crane includes a first bracket and a second bracket which are separately arranged in a length direction of the main boom 200 and located at a lateral surface of the main boom 200. The arrangement of the method for retracting the auxiliary boom is reverse to that of the method for mounting the auxiliary boom 100. The method for retracting the auxiliary boom includes the following steps:

Step S210: driving a driving mechanism 23 of a jackscrew mechanism 2 on a side away from the first bracket, so that a first shaft 21 and a second shaft 22 driven by the driving mechanism 23 retract to disconnect the auxiliary boom 100 from the main boom 200 on the side. That is, the first shaft 21 and the second shaft 22 on a side B both retract, thereby disconnecting the auxiliary boom 100 from the main boom 200 on the side B.

The specific step is as follows: when the auxiliary boom 100 is to be dismounted, a gear 237 is rotated in a direction opposite to that when mounting the auxiliary boom 100; the rotation of the gear 237 drives a drum 233 to rotate synchronously, and the rotation of the drum 233 drives the first shaft 21 and the second shaft 22 in threaded connection therewith to retract, thereby realizing the retraction of the first shaft 21 and the second shaft 22 on the side B.

Step S220: continuing to rotate the auxiliary boom 100 until the auxiliary boom 100 is close to the first bracket of the main boom 200.

Step S230: connecting the auxiliary boom 100 with the first bracket.

Step S240: continuing to rotate the auxiliary boom 100 so that the auxiliary boom 100 is close to the second bracket. In which, the second bracket is mounted on the main boom 200, and the second bracket and the first bracket are arranged at an interval.

Step S250: driving the driving mechanism 23 of the jackscrew mechanism 2 on a side close to the first bracket, so that the first shaft 21 and the second shaft 22 driven by the driving mechanism 23 retract, and the auxiliary boom 100 is completely disconnected from the main boom 200. That is, the first shaft 21 and the second shaft 22 on the side A retract simultaneously, and the auxiliary boom 100 is disconnected from the main boom 200 on the side A. Since the disconnection on the side B has been made in step S210, after the disconnection on the side A, the auxiliary boom 100 is disconnected from the main boom 200 on both the side A and the side B, and in this case, the auxiliary boom 100 is completely disconnected from the main boom 200.

Step S260: connecting the auxiliary boom 100 with the second bracket.

According to this technical solution, the auxiliary boom 100 is conveniently dismounted from the main boom 200.

In the description of the present disclosure, it should be understood that the orientations or positional relationships indicated by the terms such as 'center' 'longitudinal', 'horizontal', 'front', 'rear', 'left', 'right', 'vertical', 'horizontal', 'top', 'bottom', 'inner' and 'outer' are based on those shown in the drawings, and only for the convenience of describing the present disclosure and simplifying the description, rather than indicating or implying that the stated devices or elements must have particular orientations or be configured and operated in particular orientations, and therefore should not be construed as limitations to the protection scope of the present disclosure.

Finally, it should be noted that the above embodiments are only used to illustrate, rather than limiting, the technical solutions of the present disclosure. Although the present disclosure has been described in detail with reference to the preferred embodiments, those skilled in the art should understand that the specific embodiments of the present disclosure can still be modified or some technical features can be equivalently replaced without deviating from the spirit of the technical solutions of the present disclosure, and those modifications and equivalent replacements should fall within the protection scope of the technical solutions of the present disclosure.

The invention claimed is:

1. An auxiliary boom, comprising:

an auxiliary boom body comprising a connecting frame; the connecting frame comprises a first connecting hole and a second connecting hole which are coaxially arranged; and a jackscrew mechanism comprising a first shaft, a second shaft and a driving mechanism; the first shaft and the second shaft are both arranged between the first connecting hole and the second connecting hole and coaxial with the first connecting hole; the driving mechanism is in driving connection with both the first shaft and the second shaft to drive the first shaft and the second shaft to protrude simultaneously and retract simultaneously;

wherein when the first shaft is in a protruded state, the first shaft is inserted into the first connecting hole; when the first shaft is in a retracted state, the first shaft leaves the first connecting hole; when the second shaft is in the protruded state, the second shaft is inserted into the second connecting hole; and when the second shaft is in the retracted state, the second shaft leaves the second connecting hole, wherein the driving mechanism comprises:

a first connecting seat fixedly connected to the connecting frame and provided with a first through hole allowing the first shaft to pass through;

a second connecting seat fixedly connected to the connecting frame and provided with a second through hole allowing the second shaft to pass through; and a drum arranged between the first connecting seat and the second connecting seat and rotatably connected to at least one thereof;

wherein an end of the first shaft facing the drum is provided with a first thread, a first end of the drum is correspondingly provided with a first thread segment in a thread fit with the first thread, and the first shaft is located in the first through hole; an end of the second shaft facing the drum is provided with a second thread, and a second end of the drum is correspondingly provided with a second thread segment in a thread fit with the second thread, and the second shaft is located in the second through hole; a screwing direction of the first thread is opposite to that of the second thread;

wherein the driving mechanism further comprises:

a first bearing, an inner ring of which is arranged to sleeve the drum;

a first end cover with a first concave portion, and the first end cover is fixedly connected to an outer ring of the first bearing and the second connecting seat; and a second end cover with a second concave portion, and the second end cover is fixedly connected to the outer ring of the first bearing and the second connecting seat;

wherein the first concave portion and the second concave portion are spliced together to form a mounting cavity for accommodating the first bearing.

2. The auxiliary boom according to claim 1, wherein an outer wall of the second end of the drum is provided with meshing teeth; the driving mechanism further comprises:

a gear located outside the drum and in the second through hole of the second connecting seat, the gear being meshed with the meshing teeth; and a gear shaft inserted into a through hole of the gear and rotatably connected to the second connecting seat.

3. The auxiliary boom according to claim 2, wherein the number of teeth of the gear is smaller than that of the meshing teeth provided on the outer wall of the second end of the drum.

4. The auxiliary boom according to claim 2, wherein one end of the gear shaft protrudes out of the second through hole of the second connecting seat, and a portion of the other end of the gear shaft located outside the second through hole is configured to be non-circular.

5. The auxiliary boom according to claim 1, wherein the jackscrew mechanism further comprises:

a guiding mechanism comprising a first guiding member; the first guiding member comprises a first mounting end and a first protruding end which are fixedly connected; the first mounting end is mounted on the first connecting seat, and the first protruding end protrudes into the first through hole;

wherein an outer wall of the first shaft is provided with a first chute, a length direction of which is parallel with an axial direction of the first shaft; the first protruding end is inserted into the first chute.

6. The auxiliary boom according to claim 5, wherein the guiding mechanism further comprises:

a second guiding member comprising a second mounting end and a second protruding end which are fixedly connected; the second mounting end is mounted on the second connecting seat, and the second protruding end protrudes into the second through hole;

wherein an outer wall of the second shaft is provided with a second chute, a length direction of which is parallel with an axial direction of the second shaft; the second protruding end is inserted into the second chute.

7. The auxiliary boom according to claim 1, wherein the size of an end of the first shaft away from the drum is smaller than that of an end of the first shaft facing the drum; and/or the size of an end of the second shaft away from the drum is smaller than that of an end of the second shaft facing the drum.

8. The auxiliary boom according to claim 1, wherein along a width direction of the auxiliary boom body, two sides of the connecting frame in a width direction thereof are provided with at least one group of the first connecting hole and the second connecting hole respectively; and the jackscrew mechanism is arranged between each group of the first connecting hole and the second connecting hole.

9. A crane, comprising the auxiliary boom according to claim 1.

10. The crane according to claim 9, further comprising:

a main boom, a lateral portion of which is provided with a first bracket for fixing the auxiliary boom; the first bracket is provided with a pin hole;

a boom head of the main boom being provided with an insertion hole, a boom head of the auxiliary boom being provided with a first connecting hole and a second connecting hole, and the auxiliary boom being provided with a fixing hole at a position corresponding to the pin hole;

a first limiting mechanism located at a lateral portion of the boom head of the main boom to assist an auxiliary boom pin hole to be aligned with a main boom pin hole; and a second limiting mechanism located at the lateral portion of the main boom to assist the fixing hole to be aligned with the pin hole.

11. The crane according to claim 10, wherein the first limiting mechanism comprises:

a first bolt; and a stud connected to the lateral portion of the boom head of the main boom, the first bolt being in threaded connection with the stud.

12. The crane according to claim 11, wherein a first nut is provided between the first bolt and the stud.

13. The crane according to claim 11, wherein the stud is fixedly connected to the lateral portion of the boom head of the main boom.

14. The crane according to claim 10, wherein the second limiting mechanism comprises:

a second bolt in threaded connection with the lateral portion of the main boom.

15. The crane according to claim 10, wherein the second limiting mechanism further comprises:

a second nut provided on the second bolt.

16. A method for unfolding an auxiliary boom, wherein the auxiliary boom is the auxiliary boom according to claim 1, the method for unfolding the auxiliary boom comprising the following steps of:

rotating the auxiliary boom around a first bracket until a first connecting hole and a second connecting hole on one side of the auxiliary boom in a width direction are aligned with insertion holes of the main boom, respectively; wherein two coaxial insertion holes are arranged on each side of the main boom in a width direction thereof, and wherein one of the insertion holes corresponds to the first connecting hole and the other of the insertion holes corresponds to the second connecting hole; the first bracket is mounted on the main boom, and the auxiliary boom is rotatably connected to the first bracket;

driving a driving mechanism of a jackscrew mechanism of the auxiliary boom so that the first shaft on the one side of the auxiliary boom in the width direction is inserted into the first connecting hole and one of the insertion holes, and the second shaft on the one side of the auxiliary boom in the width direction is inserted into the second connecting hole and the other of the insertion holes.

17. The method for unfolding the auxiliary boom according to claim 16, further comprising the following steps of:

continuing to rotate the auxiliary boom until the first connecting hole and the second connecting hole on the other side of the auxiliary boom in the width direction are aligned with the insertion holes of the main boom, respectively;

driving the driving mechanism of the jackscrew mechanism of the auxiliary boom so that the first shaft on the other side of the auxiliary boom in the width direction is inserted into the first connecting hole and one of the insertion holes, and the second shaft on the other side of the auxiliary boom in the width direction is inserted into the second connecting hole and the other of the insertion holes.

18. A method for retracting an auxiliary boom, wherein the auxiliary boom is the auxiliary boom according to claim 1, and the method for retracting the auxiliary boom comprises the following steps of:

driving a driving mechanism of a jackscrew mechanism on a side of the auxiliary boom away from a first bracket, so that a first shaft and a second shaft driven by the driving mechanism retract to disconnect the auxiliary boom from a main boom on the side, wherein the first bracket is fixed to the main boom;

continuing to rotate the auxiliary boom until the auxiliary boom is close to the first bracket of the main boom;

connecting the auxiliary boom with the first bracket;

continuing to rotate the auxiliary boom so that the auxiliary boom is close to a second bracket, wherein the second bracket is mounted on the main boom, and the second bracket and the first bracket are arranged at an interval;

driving the driving mechanism of the jackscrew mechanism on a side close to the first bracket, so that the first shaft and the second shaft driven by the driving mechanism retract, and the auxiliary boom is completely disconnected from the main boom;

connecting the auxiliary boom with the second bracket.

* * * * *